(12) United States Patent
Bouché

(10) Patent No.: US 7,225,698 B2
(45) Date of Patent: Jun. 5, 2007

(54) MODULAR TRANSMISSION

(75) Inventor: Bernhard Bouché, Bargteheide (DE)

(73) Assignee: Getriebebau NORD GmbH & Co. KG, Bargteheide (DE)

(*) Notice: Subject to any disclaimer, the term of this patent is extended or adjusted under 35 U.S.C. 154(b) by 0 days.

(21) Appl. No.: 11/007,480

(22) Filed: Dec. 8, 2004

(65) Prior Publication Data

US 2005/0081662 A1    Apr. 21, 2005

Related U.S. Application Data

(63) Continuation of application No. 10/199,213, filed on Jul. 19, 2002, now abandoned.

(30) Foreign Application Priority Data

Jul. 21, 2001  (DE) .................... 101 35 602

(51) Int. Cl.
*F16H 1/16* (2006.01)
*F16H 1/20* (2006.01)

(52) U.S. Cl. .................... 74/425; 74/421 A
(58) Field of Classification Search ............ 74/22 A, 74/330, 335, 421 A, 421 R, 425; 192/69.9
See application file for complete search history.

(56) References Cited

U.S. PATENT DOCUMENTS

| | | | |
|---|---|---|---|
| 3,234,808 A * | 2/1966 | Nelson | 74/421 A |
| 3,301,081 A | 1/1967 | Kern, Jr. | 74/427 |
| 3,434,366 A * | 3/1969 | Eisenhart et al. | 74/421 R |
| 3,813,956 A * | 6/1974 | Whitecar | 474/88 |
| 4,020,715 A | 5/1977 | Sollars | 74/606 R |
| 4,111,069 A * | 9/1978 | Blair et al. | 74/606 R |
| 4,185,514 A * | 1/1980 | Edwards | 74/425 |
| 4,841,793 A | 6/1989 | Leigh-Monstevens et al. | 74/335 |
| 4,869,354 A | 9/1989 | Brazier | 192/67 R |
| 5,220,852 A * | 6/1993 | Shinoda et al. | 74/606 R |
| 5,375,479 A * | 12/1994 | Kouno et al. | 74/420 |
| 5,429,552 A * | 7/1995 | Scherner et al. | 464/17 |

(Continued)

FOREIGN PATENT DOCUMENTS

EP    0 687 837    6/1995

(Continued)

OTHER PUBLICATIONS

Patent Abstract of Japan Publication No. 2000110895 dated Apr. 18, 2000, 1 page in English.

*Primary Examiner*—Richard Ridley
*Assistant Examiner*—James Pilkington
(74) *Attorney, Agent, or Firm*—Alix, Yale & Ristas, LLP

(57) ABSTRACT

The invention relates to a modular transmission that can be combined with a drive module having an output shaft. The modular transmission comprises at least one worm-gear module that can be coupled directly to the drive module output shaft by an insertable clutch and an intermediate flange. The worm shaft of the worm-gear module has clutch toothing complementary to a clutch toothing of the insertable clutch. The modular transmission may also include one or more spur-gear modules interposed between the drive module and worm-gear module. Each spur-gear module is provided with an output-side spur wheel with clutch toothing compatible with the clutch toothing of the worm shaft.

8 Claims, 2 Drawing Sheets

U.S. PATENT DOCUMENTS

| | | | |
|---|---|---|---|
| 5,816,116 A | 10/1998 | Antony et al. | 74/606 R |
| 6,029,532 A * | 2/2000 | Phillips | 74/421 R |
| 6,032,550 A | 3/2000 | Rugh | 74/425 |
| 6,125,717 A * | 10/2000 | Phillips | 74/606 R |
| 6,205,877 B1 * | 3/2001 | Vilain | 74/413 |
| 6,229,233 B1 * | 5/2001 | Torii et al. | 310/75 R |
| 6,234,037 B1 * | 5/2001 | Zimmer | 74/421 A |
| 6,247,867 B1 | 6/2001 | Speer | 403/1 |
| 6,288,464 B1 | 9/2001 | Torii et al. | 310/78 |
| 6,386,056 B1 * | 5/2002 | Bachnak et al. | 74/89.14 |
| 6,869,378 B2 * | 3/2005 | Yamasaki et al. | 475/149 |

FOREIGN PATENT DOCUMENTS

| | | |
|---|---|---|
| EP | 1 045 169 | 10/2000 |
| JP | 2000110895 | 4/2000 |

* cited by examiner

MODULAR TRANSMISSION

CROSS REFERENCE TO RELATED APPLICATIONS

This application is a continuation of Ser. No. 10/199,213, filed Jul. 19, 2002 now abandoned.

FIELD OF THE INVENTION

The invention relates to modular transmissions that may also be referred as so-called catalogue transmissions which are industrial transmissions allowing many versions or variants for different applications.

BACKGROUND OF THE INVENTION

Catalogue transmissions are listed in very many versions or variants (types of fastening, ratios, constructions sizes, shaft arrangements, etc.) in usually comprehensive catalogues of the manufacturers. Most tasks can be performed with catalogue transmissions of this type. Moreover, in contrast to special transmissions, they can be delivered quickly and also cost-effectively in small quantities.

So that this large number of versions or variants can be delivered quickly and cost-effectively, modular transmission systems are used nowadays, which manage with a small number of parts manufactured and intermediately stored in relatively large batches, to produce a large number of versions or variants of modular transmissions.

Thus, German Published Patent Application No. DE 199 17 145 A1 discloses a modular transmission system which uses spur gears and flat gears.

German Patent No. DE 197 33 546 C describes a modular transmission consisting of two or more transmission modules of identical or different type of construction, which in each case comprise one or more transmission sizes and, within a size, one or more ratios and of which at least one transmission module is an angular gear in the form of a crown gear, whilst a spur toothing of the electric motor can also engage into a crown wheel.

SUMMARY OF THE INVENTION

An object of the invention is to provide a modular transmission allowing a cost effective production and assembly.

A further object of the invention is to provide a modular transmission allowing a cost effective production and assembly even in the case of small quantities.

The invention thus concerns a modular transmission which is combinable with a drive module having an output shaft, said transmission comprising at least one worm-gear module having a worm shaft, wherein the worm shaft has a clutch toothing;

wherein at least one spur-gear module is capable of being interposed between the drive module and the drive module;

wherein the spur-gear module is provided with an output-side spur wheel; and wherein the output-side spur wheel has a clutch toothing capable of being brought into engagement with the clutch toothing of the worm shaft.

A modular form of construction is thereby afforded, in which the output shaft of a motor or engine can be brought into engagement with clutch toothing on a worm shaft of a worm-gear module with the aid of an insertable clutch. Also, as needed, at least one spur-gear module can be interposed between the drive module and worm-gear module. The spur-gear module includes an output spur wheel with clutch teeth compatible with the clutch toothing of the worm shaft and an input shaft having clutch toothing compatible with the clutch toothing of the insertable clutch.

In a modular transmission of this type, preassembled modules are used, which each form an individual transmission stage. In this case, the modular system comprises as modules a plurality of worm-gear construction sizes, the worm shaft of which has on the drive side an externally toothed clutch toothing, into which an internally toothed clutch toothing of a sliding clutch or of a spur-gear module can engage. By means of this denture clutch, a distortion-free and easily mountable and demountable connection of the engine shaft and worm shaft is implemented. By means of a range of sliding clutches and mounting flanges, it is possible to combine a ready-assembled worm gear with motors or engines of different standards and construction sizes, if appropriate with one or more spur-gear modules being interposed.

The stages of worm gears are conventionally constructed with transmission ratios of 4 to 100. If this ratio is not sufficient, a corresponding preassembled spur-gear module is connected in front.

In particular, by virtue of the modular set-up, it is possible, to reduce the diversity of parts, to use identical spur-wheel preliminary stages for different worm-gear construction sizes.

Further objects, advantages and embodiments of the invention may be gathered from the following description.

BIEF DESCRIPTION OF THE DRAWINGS

The invention will be explained in more detail below with reference to an exemplary embodiment illustrated in the accompanying drawings.

DETAILED DESCRIPTION OF THE PREFERRED EMBODIMENT

Figure 1:
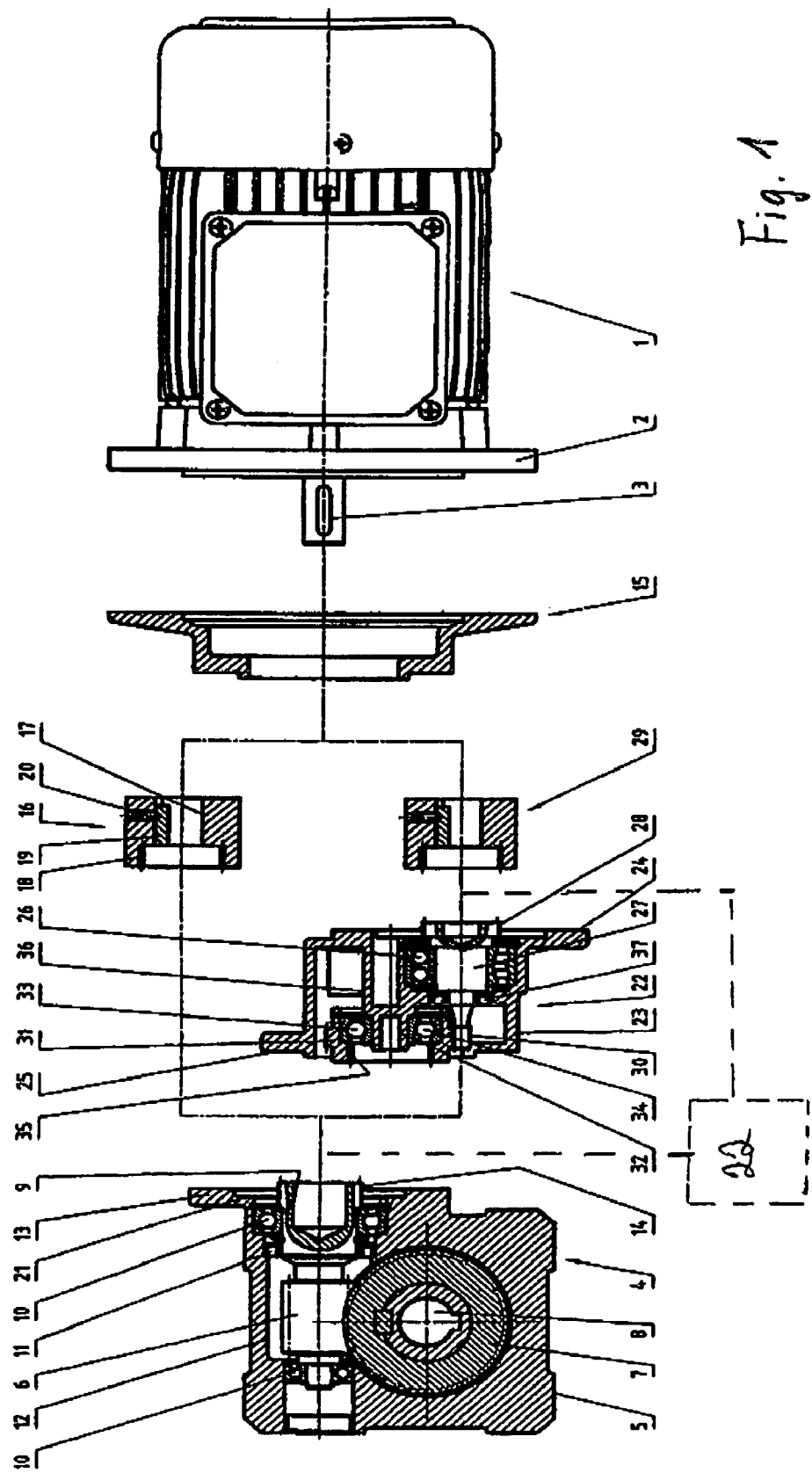
FIG. 1 shows a sectional and exploded view of a modular transmission according to the invention.
Figure 2:
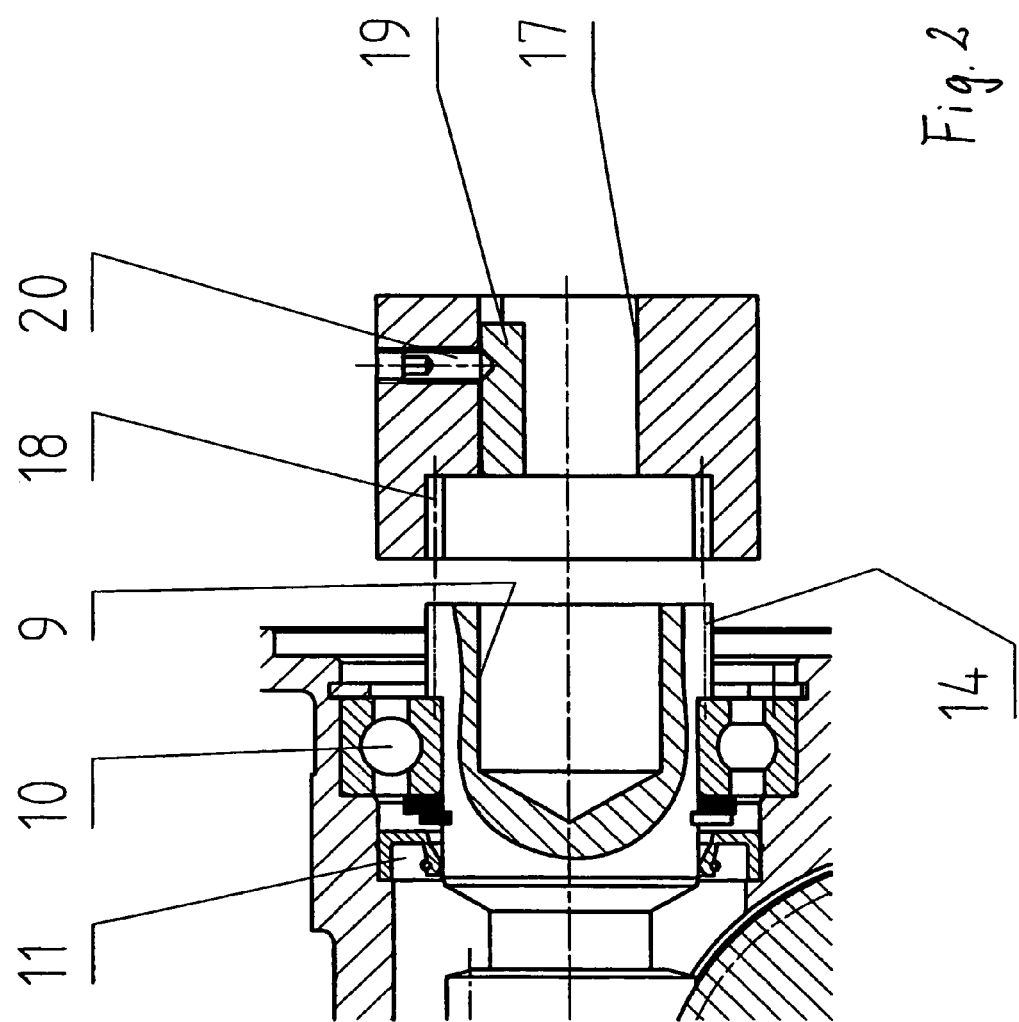
FIG. 2 shows an enlarged detail from FIG. 1.

The illustrated embodiment of the inventive modular transmission illustrated in FIGS. 1 and 2 comprises a drive module 1 in the form of an electric motor, with a mounting flange 2 and an output shaft 3, and also a worm-gear module 4. The latter comprises a case 5, in which is mounted an input-side worm shaft 6 which meshes with a worm wheel 7 likewise mounted in the case 5 and driving an output shaft 8.

The worm shaft 6 comprises, at its end facing outwards, a hollow bearing journal 9 which is produced in one piece with the worm shaft 6 and which, like the other end of the worm shaft 6, is mounted in the case 5 via a bearing 10. A shaft seal 11 between the bearing journal 9 and the case 5 is arranged adjacently to the bearing 10 supporting the bearing journal 9.

To receive the bearings 10 and the shaft seal 11, the case 5 possesses a stepped bore 12, the bearing 10 for the bearing journal 9 being inserted to a depth such that an end portion of the bearing journal 9, can project outwards somewhat with respect to a drive-side case flange 13 of the case 5 in which the bore 12 issues. the end portion of the bearing journal 9 is provided on the outside with a clutch toothing 14.

The worm-gear module 4 can be flanged to the drive module 1, if appropriate with the interposition of a mounting flange 15 adapted to the drive module 1 to be used and of a sleeve-shaped insertable clutch 16, using the case flange 13 and a lathe-turned centering recess 21 of the bore 12.

The insertable clutch 16 comprises a stepped bore 17 which, on the one hand, receives the output shaft 3 of the drive module 1 and, on the other hand, has an internally toothed clutch toothing 18. The insertable clutch 16 and the output shaft 3 are connected via a feather key 19 and a grub screw 20.

The internally toothed clutch toothing 18 can be pushed onto (in meshed relationship) the externally toothed clutch toothing 14.

In this way, depending on the drive module 1 to be used and the particular application, a single-stage worm-gear engine with direct engine mounting or with a mounting flange 15 and an insertable clutch 16 can be formed in a modular manner.

However, a spur-gear module 22 may also be interposed between the drive module 1 and the worm-gear module 4.

The spur-gear module 22 comprises a case 23 with flanges 24, 25 arranged on opposite sides. An input shaft 27 is mounted in the case 23 via a double-row ball bearing 26 and is sealed by means of a shaft sealing ring 37, the input shaft 27 carrying on the end face, towards the drive module 1, an externally toothed clutch toothing 28 which, if appropriate, can be connected to the drive module 1, via an insertable clutch 29, corresponding to the insertable clutch 16, and a mounting flange 15, in order to form a two-stage spur-wheel/ worm-gear engine with a mounting flange 15 and an insertable clutch 29.

The input shaft 27 is designed, at the end facing away from the clutch toothing 28, as a pinion 30 which meshes with an output-side spur wheel 31 of the spur-gear module 22. The spur wheel 31 is mounted on a journal 32 of the case 23 via a ball bearing 33 which is supported on a shoulder of a stepped axial bore 34 of the spur wheel 31. The outwardly directed portion of the axial bore 34 is provided with an internally toothed clutch toothing 35 which can be pushed onto the externally toothed clutch toothing 14 of the worm shaft 6.

The journal 32 is located, on the end face, in an inwardly directed projection 36 of the case 23.

A plurality of spur-gear modules 22, for example with different transmission ratios, may also be connected in series, in which case the internally toothed clutch toothing 35 of the first spur-gear module 22 must fit onto the externally toothed clutch toothing 28 of the input shaft 27 of the following spur-gear module 22, if appropriate with an insertable clutch being interposed.

The worm-gear and spur-gear modules of a modular transmission, in accordance with one aspect of the present invention have compatibly configured input and output clutch toothing. This feature permits a catalogue transmission to be assembled from a plurality of standardized worm-gear and spur-gear modules having different load capacities and/or gear ratios to meet a particular specification. A method of manufacturing a modular transmission to meet a specified load capacity and drive speed in accordance with this feature of the present invention may comprise the steps of:

providing a plurality of worm-gear modules, each worm-gear module having a worm shaft with clutch toothing, the plurality of worm-gear modules including worm-gear modules having a range of load capacities and worm gear modules having a range of gear ratios;

providing a plurality of insertable clutches, each insertable clutch having an output side with clutch toothing compatible with the clutch toothing of the worm shafts, said plurality of insertable clutches including insertable clutches with input sides compatible with a range of drive module output shafts and insertable clutches having a range of load capacities;

providing a plurality of spur-gear modules, each spur-gear module including an output-side spur wheel having clutch toothing compatible with the clutch toothing of the worm shafts and an input shaft having clutch toothing compatible with the output side of the insertable clutches, said plurality of spur-gear modules configured for assembly between a selected drive module and a selected worm-gear module and including spur-gear modules having a range of load capacities and spur-gear modules having a range of load capacities;

selecting a drive module from among a plurality of drive modules having different power outputs and output shaft configurations;

attaching an insertable clutch to the output shaft of the selected drive module, the insertable clutch having an having an input side compatible with the output shaft configuration of the selected drive module and a load capacity compatible with the power output of the selected drive module, the insertable clutch selected from the plurality of insertable clutches;

attaching (if needed) at least one spur-gear module to the insertable clutch such that the output side clutch toothing of the insertable clutch meshes with the input shaft clutch toothing of the spur-gear module, the spur gear module having a gear ratio and load capacity compatible with the specified load capacity and drive speed, the spur-gear module selected from the plurality of spur-gear modules; and attaching a worm-gear module to the output side of the insertable clutch or the output-spur wheel of the at least one spur-gear module (when a spur-gear module is present) such that the worm shaft clutch toothing meshes with the output side clutch toothing of the insertable clutch or the clutch toothing of the output-spur wheel, said worm-gear module having a gear ratio and load capacity compatible with the specified load capacity and drive speed, the worm-gear module selected from the plurality of worm-gear modules, wherein the selected combination of drive module, insertable clutch, spur-gear module and worm-gear module provides a power train having the specified load capacity and drive speed.

While the invention has been shown and described with reference to a preferred embodiment, it should be apparent to one of ordinary skill in the art that many changes and modifications may be made without departing from the spirit and scope of the invention as defined in the claims.

What is claimed is:

1. A modular construction kit for a transmission to be driven by an output shaft of a drive module with a drive module flange, comprising:

a mounting flange adapted to be flanged to the drive module flange;

at least one worm-gear module provided with a worm gear module housing supporting a worm wheel meshing a perpendicular worm shaft, the worm shaft being provided with first coupling teeth coaxial with said worm shaft;

at least one spur-gear module provided with a spur-gear module housing supporting an input shaft for a pinion driving an output spur wheel, the input shaft being provided with second coupling teeth coaxial with said input shaft; and at least one coupling directly engageable with the output shaft and the first and second coupling teeth;

wherein the output spur wheel is provided with third coupling teeth concentric with said output spur wheel directly engageable with the first coupling teeth and the worm gear module and the at least one spur-gear module are connectable to the mounting flange.

2. The modular construction kit of claim 1, wherein said at least one coupling is provided with fourth coupling teeth.

3. The modular construction kit of claim 1, wherein said first and second coupling teeth are radially outwardly directed teeth and said third coupling teeth are radially inwardly directed teeth.

4. The modular construction kit of claim 1, wherein said input shaft is a unitary shaft extending from said pinion to said second coupling teeth, wherein said input shaft and said coupling have a common axis of rotation.

5. The modular construction kit of claim 1, wherein said spur-gear module housing includes a projection and said output spur wheel is mounted for rotation about said projection.

6. The modular construction kit of claim 1, wherein said pinion and second coupling teeth are formed in one piece with said input shaft.

7. The modular construction kit of claim 1, wherein said at least one spur gear module comprises a second spur gear module having an input shaft with coupling teeth complementary to said third and fourth coupling teeth.

8. The modular construction kit of claim 1, wherein said at least one spur gear module comprises a plurality of spur gear modules each having an input shaft with coupling teeth complementary to said third and fourth coupling teeth and an output spur wheel with coupling teeth complementary to said first and second coupling teeth.

* * * * *